(12) United States Patent
Krumböck et al.

(10) Patent No.: US 6,401,480 B2
(45) Date of Patent: Jun. 11, 2002

(54) DEVICE FOR CALIBRATING COOLING OF AN EXTRUDED SYNTHETIC PROFILE

(75) Inventors: Erwin Krumböck, Ansfelden; Wolfgang Gasselseder, Oberneukirchen, both of (AT)

(73) Assignee: a + g extrusion technology GmbH, Pasching (AT)

(*) Notice: Subject to any disclaimer, the term of this patent is extended or adjusted under 35 U.S.C. 154(b) by 0 days.

(21) Appl. No.: 09/772,472

(22) Filed: Jan. 30, 2001

(30) Foreign Application Priority Data

Feb. 1, 2000 (AT) ............................................. 146/00

(51) Int. Cl.[7] ......................... F25D 17/02; B29B 13/04
(52) U.S. Cl. ........................... 62/374; 62/64; 425/384
(58) Field of Search ............................. 62/63, 64, 374, 62/378, 375, 380; 425/326.1, 384; 264/209.4

(56) References Cited

U.S. PATENT DOCUMENTS

| | | | | |
|---|---|---|---|---|
| 5,373,893 A | * | 12/1994 | Eisenmann et al. | 165/65 |
| 5,377,492 A | * | 1/1995 | Robertson et al. | 62/63 |
| 5,458,485 A | * | 10/1995 | Righetti | 432/78 |
| 5,499,507 A | * | 3/1996 | Dorninger | 62/63 |
| 5,505,058 A | * | 4/1996 | Dorninger | 62/374 |
| 5,832,740 A | * | 11/1998 | Gautiero | 62/374 |
| 6,066,288 A | * | 5/2000 | Purstinger | 264/568 |
| 6,244,847 B1 | * | 6/2001 | Wegmaier et al. | 425/71 |

FOREIGN PATENT DOCUMENTS

| | | |
|---|---|---|
| DE | 1 629 733 | 11/1967 |
| DE | 195 04 981 | 2/1995 |
| EP | 0 659 536 | 12/1994 |
| EP | 0 811 472 | 6/1997 |

* cited by examiner

*Primary Examiner*—William C. Doerrler
(74) *Attorney, Agent, or Firm*—Collard & Roe, P.C.

(57) ABSTRACT

A device (1) for calibrating cooling of an extruded synthetic profile (P) exhibits a water tank (2) through which coolant flows by means of coolant inlet and outlet pipes (5, 6), which water tank (2) extending longitudinally in the direction of extrusion is subdivided into single cooling chambers (4) by means of calibrating apertures (3) for the synthetic profile (P) spaced at a mutual distance in series in the direction of extrusion. To ensure effective cooling a coolant inlet pipe (5) discharges into each cooling chamber (4) and the cooling chambers (4) are each attached to a coolant outlet (6) by means of an outlet opening (12, 13).

5 Claims, 2 Drawing Sheets

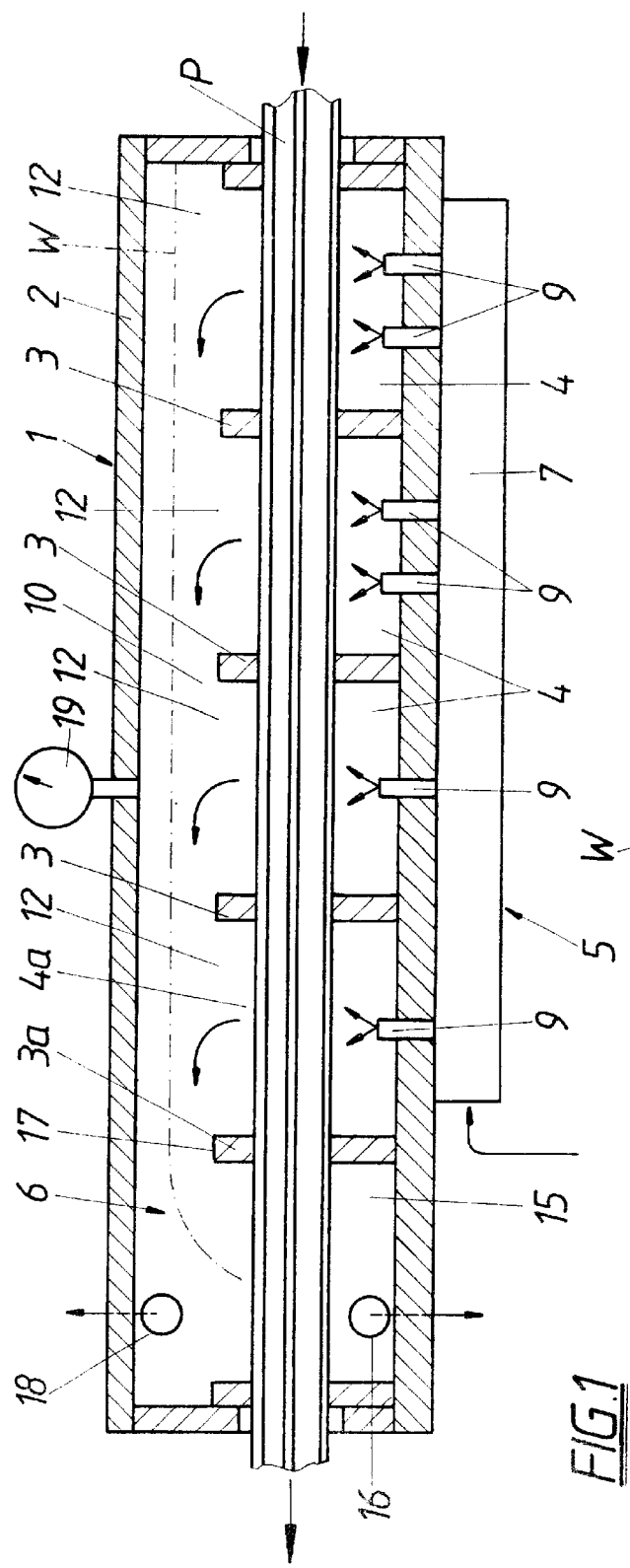
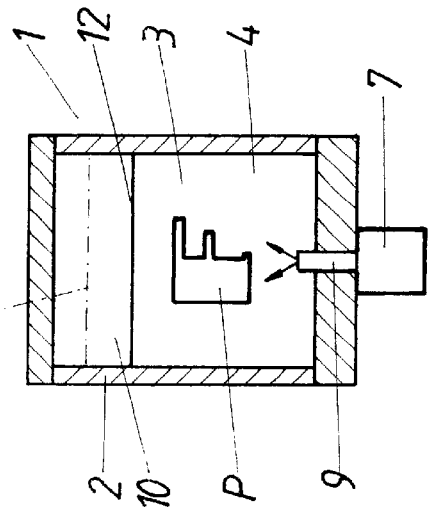

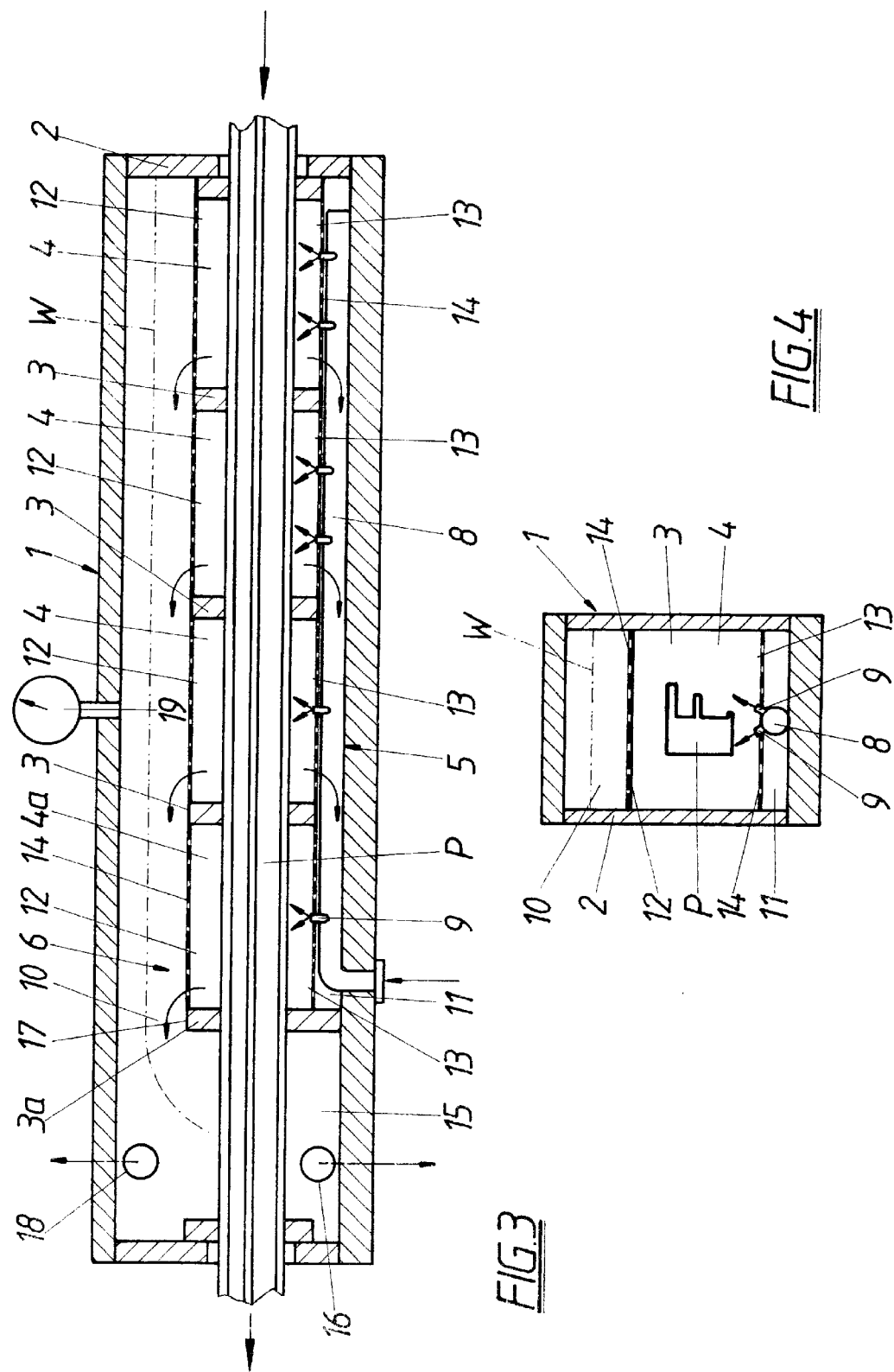

DEVICE FOR CALIBRATING COOLING OF AN EXTRUDED SYNTHETIC PROFILE

FIELD OF THE INVENTION

The present invention relates to a device for calibrating cooling of an extruded synthetic profile having a water tank through which cool water can flow through cool water supply and outlet pipes, which extends longitudinally in the direction of extruding and is subdivided into individual cooling chambers by means of calibrating diaphragms spaced at a mutual distance in series in the direction of extruding.

DESCRIPTION OF THE PRIOR ART

With extrusion of synthetic profiles, window profiles made of PVC for example, after the extruder and the molding profile nozzle for exact-size cooling most times the profile billet is first guided through a dry calibrator and then through a wet calibrator, whereby the wet calibrations operate with either a spray bath or a full bath. Spray baths, in which cool water is sprayed onto the profile billet to be cooled by way of a plurality of spray nozzles, contribute a major cooling effect, but they are expensive on account of the danger that the nozzles might stop up as they are interference-prone and are also associated with high water consumption. In full baths the synthetic billet to be cooled is on the other hand guided through a water tank filled with coolant and thereby drawn through calibration apertures, resulting in less structural expense and lower water consumption, although the cooling effect remains unsatisfactory.

To improve the cooling effect it has been proposed according to EP 0 659 536 to provide the calibration apertures of the water tank, in addition to the apertures, with other openings for generating a turbulent flow of the cool water in the cooling chambers. This coolant flow requires a differential pressure between inlet and outlet sides of the calibration apertures, whereby only a very limited differential pressure is available in the water tank and it is a question of moderate eddying of the coolant as it flows through the turbulence openings. The additional cooling effect attainable via the turbulent flow is accordingly insufficient. Furthermore, all the coolant must flow through the individual chambers, making it impossible for the quantity of coolant in the cooling chambers to match the actual cooling requirement and whereby the consumption of coolant cannot be minimized. If, for the purpose of increasing the geometrical security of the profile, the water tank is impacted with negative pressure on account of the large quantities of flowing water in conjunction with the suctioned excess air there is the risk of undesired fluctuations which lead to variations in pressure and thus to negative effects on the profile geometry.

Similar ratios result from a cooling device according to DE 195 04 981 A which has a negative-pressure water tank subdivided into chambers by calibration apertures, whereby additional longitudinal walls on the underside of the profile billet together with through-flow openings arranged alternatively and laterally compel the coolant to flow not only along the profile billet, but around it also.

EP 0 811 472 A discloses a calibrating device having a water tank subdivided by calibrating apertures, whose coolant flow is set so low that a laminar flow limit layer results on the profile billet, which layer should be stripped as it passes through the calibrating apertures and thus the desired heat removal is to be attained. It must be doubted as to whether the cooling effect is to be improved by preventing forced turbulence. Also, zones can arise in which the coolant lingers for an exceptionally long time and takes on higher temperatures, by which the cooling effect suffers in any case.

SUMMARY OF THE INVENTION

The objective of the present invention is to produce a device of the type initially indicated, which guarantees an effective and highly efficient cooling of billets with relatively minimal structural expense.

The invention solves this task in that a coolant supply pipe terminates in each cooling chamber and the cooling chambers are connected to a coolant outlet by means of an outlet aperture. The cooling chambers are impacted with coolant by this coolant arrangement, such that the cooling effect can be best adapted to the actual cooling requirement. The coolant influx quantity can be matched precisely to the minimum required quantity of coolant, resulting in exceedingly economical water consumption. In addition, when the coolant flows out of the outlet openings of the coolant supply pipe it entrains corresponding turbulence flows in the chambers, leading to heat equalization of the water in the cooling chambers and considerably increasing the billet cooling as a result of turbulently flowing surface layers. On account of the coolant flowing into each chamber and the resulting coolant efflux the influx of already warmed coolant from other chambers is stopped and thus securely prevents impairment of the cooling effect in the chambers. Not last the individual coolant impact of the chambers is extensively independent of pressure level in the water tank and accordingly is best suited to the combination with a subpressure tank for raising the dimensional stability as the profile billet is being cooled.

If the coolant supply comprises a supply pipe laid along the water tank and having at least one outlet bore or nozzle, an adequate water supply to the individual cooling chambers can be provided economically, whereby the influent quantity of water and the flow intensity and turbulence of the water flow per chamber are adjusted by variation of the number and/or diameter of these outlet bores and can thus influence the cool flow inside the chambers.

Pipes particular to removal of the coolant could be provided, yet it is an advantage if an outlet channel extending in a longitudinal tank direction above and/or below the calibration apertures is provided as coolant outlet and the cooling chambers opening upwards or downwards form the outlet openings with their open sides assigned to the outlet channel(s). Because of this in the water tank there needs to be adequate free space only for the effluent coolant to be left free between the calibrating apertures and the tank cover and/or between the calibrating apertures and the tank floor and the coolant can flow out almost without pressure. Depending on the structure of the water tank or application of the calibration apertures the outlet channel can be effectively installed in the cover or floor area and it is understandably also possible to provide outlet channels both in the cover and the floor area to further benefit the coolant efflux and to thus minimize the flow rate.

If the outlet openings are covered over by an apertured plate or similar any unwelcome influx of the already warmed coolant from adjoining chambers is securely prevented on account of the flow resistances increased with the apertured plates.

In accordance with another embodiment of the present invention a discharge chamber free of supply pipes is arranged after the cooling chambers in the flow direction of the coolant discharge, into which the coolant outlet discharges by way of an overflow formed by the calibrating aperture between discharge chamber and adjoining cooling chamber and from which two suction pipes, a lower water suction pipe and an upper air suction pipe proceed. Since the entire quantity of coolant must flow out by way of the overflow, the water level in the cooling chambers has to be preset by the altitude of this overflow. Further, the prerequisite for simple separate suctioning of water and air is offered by the discharge chamber, whereby the lower suction pipe conveys water almost continuously and the upper suction pipe essentially suctions air and spray water, if required, so that there are no fluctuations in pressure in the water tank due to a common water/air discharge. It is accordingly possible to avoid a particular separating tank for separating air and water without the vacuum pump being damaged by an excessive proportion of water in the suctioned air.

BRIEF DESCRIPTION OF THE DRAWING

The inventive object is illustrated purely diagrammatically in the drawing, in which:

FIGS. 1 and 2 show a device according to the present invention in longitudinal section or in cross-section, and FIGS. 3 and 4 show a somewhat modified embodiment also in longitudinal section or cross-section.

DESCRIPTION OF THE PREFERRED EMBODIMENTS

A device 1 for calibrating cooling of an extruded synthetic profile P includes a water tank 2 which is subdivided into individual cooling chambers 4 by means of calibrating apertures 3 for the synthetic profile P spaced at a mutual distance in series in the direction of extruding. Coolant, which flows in by way of a coolant supply pipe 5 and flows out by way of a coolant outlet, flows through water tank 2. Coolant supply pipe 5 comprises an external pipe 7 (FIGS. 1 and 2) laid along water tank 2, or an inner pipe 8 (FIGS. 3 and 4) laid along water tank 2, which exhibits at least one discharge nozzle 9 each in the vicinity of cooling chambers 4. Coolant outlet 6 includes a discharge channel 10 (FIGS. 1 and 2) extending over calibration apertures 3 in the tank longitudinal direction or discharge channels 10, 11 (FIGS. 3 and 4) extending above and below the calibration apertures in the tank longitudinal direction, whereby cooling chambers 4 opening upwards or downwards form outlet openings 12, 13 with the corresponding upper or lower open sides connecting to outlet channels 10, 11. As indicated in the embodiment according to FIGS. 3 and 4 said outlet openings 12, 13 can be covered over with apertured plates 14 to prevent any unwelcome influx of coolant from adjoining chambers by the associated increased flow resistances.

Cooling chambers 4 are impacted with coolant through outlet supply pipes 5, 6 coordinated with the individual chambers, so that a cooling effect easily adapted to the respective cooling ratios in the individual chambers is achieved, whereby the quantity of coolant per chamber can be set by the number and the cross-section of the nozzles and turbulence and good intermixing of water occur for improving the cooling effects by the coolant discharging from corresponding discharge nozzles 9. The coolant flows out of individual chambers 4 through outlet openings 12, 13 into upper or lower discharge channel 10, 11 and thus reaches a discharge chamber 15 arranged after cooling chambers 4 in the direction of flow, from which it is suctioned by way of a water suction pipe 16. Calibration aperture 3a between discharge chamber 15 and adjacent cooling chamber 4a forms an overflow 17 by means of which the outlet channels discharge into discharge chamber 15, so that the water level W can be influenced in cooling chambers 4 by means of overflow 17.

In order to guarantee dimensionally stable guiding of synthetic profile P into calibration apertures 3 during cooling, water tank 2 is impacted negatively, for which there is an air suction pipe 18 connected to a vacuum pump not illustrated here; the subpressure can be controlled by means of a manometer 19. If the suction pipes, namely lower water suction pipe 16 and upper air suction pipe 18, are arranged in discharge chamber 15, there is sufficient separation of the air or water suction inside water tank 2 and suction pipes 16, 18 can be connected directly to vacuum pumps or water pumps without interposition of a separating tank or similar.

What is claimed is:

1. An apparatus for calibrating and cooling an extruded synthetic profile extending in a longitudinal direction, which comprises (a) a water tank arranged to receive a coolant flowing therethrough, (b) a series of calibrating apertures for the extruded synthetic profile, the calibrating apertures being spaced from each other in the longitudinal direction and dividing the water tank into individual cooling chambers, (c) a coolant inlet discharging coolant into each cooling chamber, and (d) a coolant outlet communicating with each cooling chamber through an outlet opening.

2. The apparatus of claim 1, wherein the coolant inlet is a pipe extending along the water tank, the pipe having at least one discharge bore or nozzle at each cooling chamber for discharging the coolant into the coolant chamber.

3. The apparatus of claim 1, wherein the coolant outlet is a discharge channel extending along the water tank adjacent an end of the calibrating apertures, an open side of the cooling chambers at the ends of the calibrating apertures providing the outlet opening through which each cooling chamber communicates with the discharge channel.

4. The apparatus of claim 3, further comprising an apertured plate covering each open side of the cooling chambers.

5. The apparatus of claim 1, further comprising a discharge chamber which receives no coolant from the coolant inlet, the discharge chamber being arranged downstream of the series of cooling chambers in the direction of coolant flow in the coolant outlet, a calibrating aperture separating the discharge chamber from the adjoining cooling chamber defining an overflow directing the coolant flowing in the coolant outlet into the discharge chamber, and a lower water suction pipe and an upper air suction pipe arranged in the discharge chamber.

* * * * *